(12) United States Patent
Tanabe et al.

(10) Patent No.: US 6,304,312 B1
(45) Date of Patent: Oct. 16, 2001

(54) OPTICAL HEAD, METHOD OF MANUFACTURING THE SAME, AND DIFFRACTION ELEMENT SUITABLE THEREFOR

(75) Inventors: Yuzuru Tanabe; Tomoki Gunjima; Hiromasa Sato; Hiroki Hotaka, all of Yokohama (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 09/101,776
(22) PCT Filed: Jan. 22, 1997
(86) PCT No.: PCT/JP97/00136
§ 371 Date: Jul. 22, 1998
§ 102(e) Date: Jul. 22, 1998
(87) PCT Pub. No.: WO97/27583
PCT Pub. Date: Jul. 31, 1997

(30) Foreign Application Priority Data

Jan. 23, 1996 (JP) .................................... 8-009621
Jun. 27, 1996 (JP) .................................... 8-167803

(51) Int. Cl.[7] .............................. G02F 1/13; G02F 1/1337
(52) U.S. Cl. ......................... 349/201; 349/129; 349/123
(58) Field of Search .................................. 349/201, 2, 9, 349/123, 86, 88, 129, 202, 128; 359/563, 573; 369/112.02, 112.1

(56) References Cited

U.S. PATENT DOCUMENTS

| | | | | |
|---|---|---|---|---|
| 4,850,681 | * | 7/1989 | Yamanobe et al. | 350/348 |
| 4,995,705 | * | 2/1991 | Yoshinaga et al. | 350/350 S |
| 5,013,141 | * | 5/1991 | Sakata | 350/348 |
| 5,207,952 | * | 5/1993 | Griffin, III | 252/592 |
| 5,319,492 | * | 6/1994 | Dorn et al. | 359/296 |
| 5,335,303 | * | 8/1994 | Buchecker et al. | 385/122 |
| 6,118,586 | * | 9/2000 | Yanabe et al. | 359/566 |

FOREIGN PATENT DOCUMENTS 5-109111 * 4/1993 (JP).

* cited by examiner

Primary Examiner—Kenneth Parker
Assistant Examiner—Mike Qi
(74) Attorney, Agent, or Firm—Oblon, Spivak, McClelland, Maier & Neustadt, P.C.

(57) ABSTRACT

As an optically anisotropic diffraction grating in an optical head for reading and/or writing of an optically recording medium, optically anisotropic diffraction grating which comprises an optically anisotropic polymer liquid crystal sandwiched between two transparent substrates are used. The optically anisotropic polymer liquid crystal can have an alignment direction periodically changed to form a grating of different refractive indices, obtaining a high-utilization efficiency by light ray and a high degree of reliability.

16 Claims, 1 Drawing Sheet

OPTICAL HEAD, METHOD OF MANUFACTURING THE SAME, AND DIFFRACTION ELEMENT SUITABLE THEREFOR

TECHNICAL FIELD

The present invention relates to an optical head for reading and/or writing information on an optically recording medium such as a CD (compact disc), a CD-ROM, another optical disc, and a magneto-optical disc, and a diffraction element suitable for such an optical head.

BACKGROUND ART

As an optical head which writes optical information or reads optical information on an optical disc, a magneto-optical disc and so on, there have been known one wherein a prism type beam splitter is used as an optical part for directing (beam-splitting) a signal ray reflected from a recording surface of a disc to a detector, and one wherein a diffracting grating or a hologram element is used as such an optical part.

In the past, the diffraction grating or the hologram element for the optical head has had a rectangular grating with a rectangular section (an isotropic diffracting grating in a relief form) formed on a glass substrate or a plastic substrate by dry etching or injecting molding, thereby reflecting a ray to obtain a beam splitting function.

In order to increase the utilization efficiency of a ray in comparison with an isotropic diffraction grating having about 10% of light ray utilization efficiency, the utilization of polarization can be thought out When polarized light is utilized, there has been a method wherein a prism type beam splitter is combined with a quarter-wave plate to improve efficiency in a forward path (a direction from a light source toward an optical recording medium) and in a backward path (a direction from the optical recording medium toward the light source and a detector) so as to raise reciprocation efficiency.

However, the prism type polarization splitter is expensive, and another system has been groped for. As a system, there has been known a method wherein a flat plate of birefringent crystal such as $LiNbO_3$ is used and the flat plate has an anisotropic diffraction grating formed thereon to obtain polarization selectivity. However, such a birefringent crystal per se is expensive, and application of the birefringent crystal to commercial utilization is difficult. When the grating is formed by proton exchanging, the proton in the proton exchange liquid is usually liable to diffuse in a $LiNbO_3$ substrate, creating a problem in that it is difficult to provide the grating with a fine pitch.

The isotopic diffraction grating has about 10% of reciprocation efficiency at the maximum because the utilization efficiency in the forward path is about 50% and the utilization efficiency in the backward path is about 20% as stated earlier.

The present invention has been made to solve these problems, and has an object to provide an optical head having high utilization efficiency of light ray and high reliability.

DISCLOSURE OF INVENTION

The present invention provides an optical head which irradiates a ray from a light source to an optically recording medium through a diffraction element so as to read information and/or write information, characterized in that the diffraction element includes an optically anisotropic diffraction grating which comprises an optically anisotropic polymer liquid crystal sandwiched between two transparent substrates, and that the polymer liquid crystal has an alignment direction thereof periodically changed, and a diffraction element suitable for such an optical head.

In a preferred mode of the present invention, both of the two transparent substrates have electrodes mounted thereon, and at least one of the electrodes comprises periodically formed electrode pieces. By such arrangement, portions with the periodically formed split electrodes and portions without the split electrodes can have different alignment states in a liquid crystal material on application of an electric field, facilitating formation of an optically anisotropic diffraction grating by the electric field.

In another preferred mode of the present invention, both of the electrodes comprise periodically formed electrode pieces, and the two electrodes are unsymmetrical arranged between the two transparent substrates. It means that both electrodes are unsymmetrical with respect to a central plane located at the center between the two transparent substrates and parallel to the two transparent substrates in such a state that a polymer liquid crystal cell has been formed. By such arrangement, the split electrodes of both of the two electrodes confront one another, having different locations and/or different sizes, and aligned portions of the polymer liquid crystal formed by the split electrodes can be unsymmetrical as a pair of upper and lower split electrodes are viewed. The optically anisotropic diffraction grating wherein either one of ±1st order diffraction rays has a higher diffraction efficiency can be easily formed by the electric field.

In these modes, it is preferable that the periodically formed electrode pieces of the at least one of the electrodes have a width of 30–45% of a periodical pitch thereof.

Both of the electrodes may comprise periodically formed electrode pieces, and the periodically formed electrode pieces of both electrodes may have a width of 30–45% of a periodical pitch thereof. In this case, the upper and lower electrode pieces may have the same width.

In another preferred embodiment of the present invention, at least one of the transparent substrates has a side thereof contacting the liquid crystal formed with an alignment layer, and at least one of the alignment layers includes alignment layer pieces which periodically have different alignment forces which periodically have different alignment forces. By such arrangement, the split alignment layers which are formed by the alignment layer pieces having periodically different alignment forces can form a certain distribution in the alignment state of the polymer liquid crystal. When one period includes several split alignment layers, the polymer liquid crystal can have an unsymmetrical alignment state in the periodical direction. In this manner, the optically anisotropic diffraction grating wherein either one of ±1st order diffraction rays partially has a high diffraction efficiency can be formed easily.

In another preferred mode of the present invention, the alignment layers of both of the two transparent substrates respectively include alignment layer pieces which periodically have different alignment forces, and the alignment layer pieces which periodically have different alignment forces are unsymmetrical arranged between the two transparent substrates. It is mean that the alignment layer pieces are unsymmetrical with respect to a central plane locating at the center between the two transparent substrates and parallel to the two transparent substrates in such a state that the polymer liquid crystal cell has been formed. By such arrangement, the respective split alignment layers on both substrates which are formed by the alignment layer pieces periodically having different alignment forces can make aligned portions of the polymer liquid crystal by the split alignment layers unsymmetrical as viewed a pair of upper and lower split alignment layers are viewed. In this manner, the optically anisotropic diffracting grating wherein either one of ±1st order diffraction rays has a higher diffraction efficiency can be formed easily by the alignment layers.

In another preferred mode of the present invention, an alignment layer is formed on an electrode, the alignment layer is one which is subjected to rubbing so as to extend perpendicularly to a longitudinal direction of the electrode.

In addition, the present invention provides a method for manufacturing an optical head which irradiates a ray from a light source to an optically recording medium through a diffraction element so as to read information and/or write information, characterized in that the method comprises providing electrodes on two transparent substrates; forming at least one of the electrodes so as to comprise periodically formed electrode pieces; providing an alignment layer on a side of at least one of the two transparent substrates which contacts a liquid crystal material; sandwiching the liquid crystal material between the two transparent substrates, the liquid crystal material being polymerizable; applying a periodical electric field to the electrodes to align the liquid crystal material; and polymerizing the liquid crystal material in such an aligned state, thereby fabricating a diffraction element which includes an optically anisotropic diffraction grating.

In a preferred mode of the present invention, the periodically formed electrode pieces include a certain number of split electrodes included in one period, the respective split electrodes in the one period have different electric fields applied thereto, the liquid crystal material in the one period has an alignment state made unsymmetrical, and then the liquid crystal material is polymerized. By such a method, an unsymmetrical diffraction grating which is equivalent to a brazed (sawtooth) configuration of diffraction grating and so on can be easily formed in one period by the electric fields in the periodical direction of the electric fields. In this manner, the optically anisotropic diffraction grating wherein either one of ±1st order diffraction rays has a higher diffraction efficiency can be easily formed by the electric fields.

In another preferred mode of the present invention, the method further comprises a step A for sandwiching the liquid crystal material in an unpolymerized state between the two transparent substrates and periodically polymerizing the liquid crystal material by periodical masking exposure, and a step B for polymerizing the entire liquid crystal material by non-masking exposure after the first step, a voltage being applied in either one of the step A and the step B. By such a method, the following processes are carried out.

The transparent substrates with the electrode and the alignment layer thereon are subjected to a rubbing treatment, providing the transparent substrates with a horizontal alignment force. The two transparent substrates are overlapped so as to have the rubbing direction conformed each other, and crystallizable monomers having photopolymerization and having positive dielectric anisotropy are sandwiched between the transparent substrates. When reed screen shape of masks are put on the transparent substrates and an ultraviolet beam is irradiated for exposure while a voltage is applied across both of the transparent substrates (the step A), a periodical structure with portions of polymer liquid crystal polymerized in a vertical alignment state and portions of crystallizable monomer unpolymerized is formed. When the masks are removed and non-masking exposure is carried out without application of a voltage (Step B), the portions of crystallizable monomer unpolymerized change into portions of polymer liquid crystal in a horizontal alignment state, providing an optically anisotropic diffraction grating which has a periodical alignment state as a whole.

In this case, when the voltage is applied in Step B, a periodical structure with the polymer liquid crystal portions polymerized in a horizontal alignment state and portions of the crystallizable monomers unpolymerized is provided in Step A, and the portions of the crystallizable monomers which have not been polymerized in Step B change into a polymer liquid crystal in a vertical alignment state.

In addition, the following mode is preferable in the present invention.

It is preferable that the direction of the alignment treatment which is applied to the two transparent substrates of the diffraction element extends perpendicularly to the periodical grating of an electrode. By such arrangement, the ellipsoidal axis of the refractive index of transient regions which are produced around the boundary of the electrode on application of the electric field can be directed to be parallel or vertical to an incident polarization direction to facilitate maintenance of the polarization linearity of a light ray transmitting through the element. The anisotropy in refractive index with respect to the polarization axis of an incident ray in the transient region can be make larger in comparison with the alignment in parallel to the periodical grating of the electrode.

It is more preferable that the angle (crossing angle) of the alignment direction between the two transparent substrates is set to 180°. The present invention is implemented in such a state that the alignment direction has an angle of about 0° or about 180° and the angle of 180° has superior response to periodical on and off of the electric field in comparison with the angle of 0°, allowing a steep grating shape to be fabricated- In addition, it is preferable that the gap between the two transparent substrates is set to not greater than 6 $\mu$m in terms of a decrease in a driving voltage and a reduction in estrangement from the rectangular grating shape caused by a leakage electric field from the boundary of the electrode.

When the electrode pieces with different width are used, the upper and lower electrode pieces can be arranged so as to be unsymmetrical, increasing the diffraction efficiency of one side portion. In particular, the width of narrower electrode pieces can be set to 30–45% of the periodical pitch of the electrode pieces to exceed the theoretical threshold level of a symmetrical grating of 40%. In addition, the provision of the gap of not greater than 6 $\mu$m between the two transparent substrates as stated earlier can restrain the leakage electric field from the electrode boundary to reflect the unsymmetry of the electrode pieces to the alignment portions more significantly. In order to make the alignment portions unsymmetrical to increase the rate of the efficiency of one side portion to that of the other side portion to not less than 1.5 times, it is preferable that the gap is set to not greater than 3 $\mu$m.

Even when only one side portion is provided with a solid electrode or both side portions are provided with upper and lower symmetrical periodical electrode pieces, it is preferable that the width of at least one of the electrode pieces is 30–45% of the periodical pitch thereof When a voltage is applied across the upper and lower electrode pieces, the electric field expands in a barrel shape so as to reach slightly outside of the electrode piece width From this standpoint, the diffraction efficiency can be improved when the electrode piece width is set to not greater than 45% of the periodical pitch of the electrode pieces than when the electrode piece width is set to 50% of the periodical pitch of the electrode pieces. If the electrode piece width is set to less than 30% of the periodical pitch of the electrode pieces, the bulge of the electric field in the barrel shape is relatively enlarged. As a result, the liquid crystal is aligned along the electric field to make the refractive index distribution of the grating unclear easily, facilitating a decrease in the diffraction efficiency on the contrary.

BEST MODE FOR CARRYING OUT THE INVENTION

Figure 1:
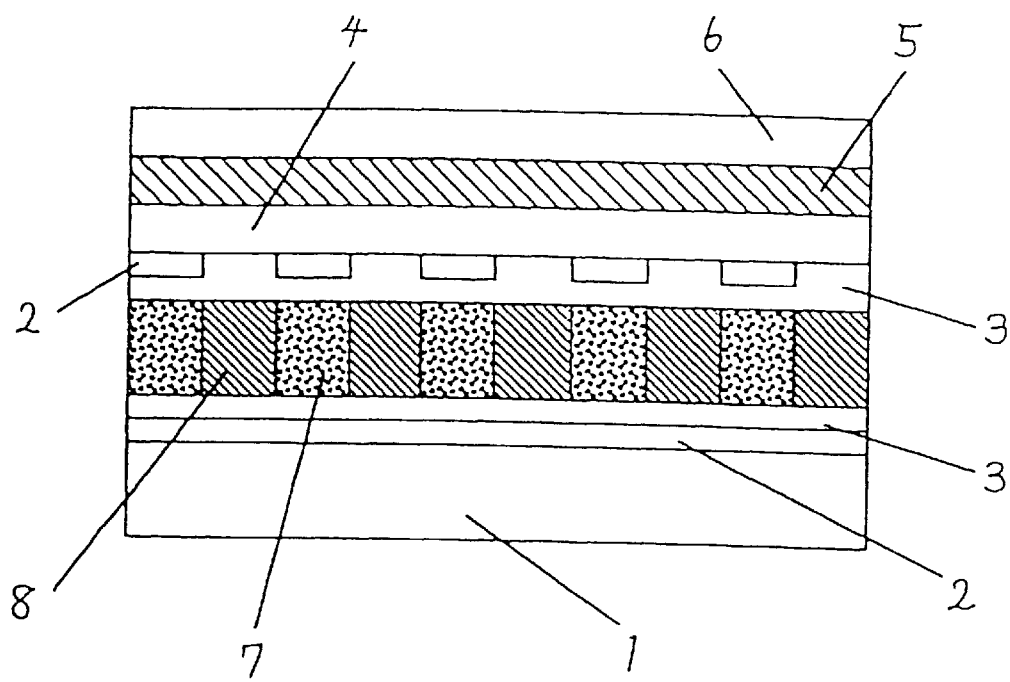
FIG. 1 is a side view in section of the diffraction element for an optical head according to an embodiment of the present invention.

In the present invention, at least one of two transparent substrates has a side thereof contacting a polymer liquid crystal formed with periodical electrodes (transparent electrodes). That is to say, one of the transparent substrates has periodical electrodes formed thereon and the other transparent substrate has a solid electrode formed thereon, or both of the transparent substrates have periodical electrodes formed thereon. An unpolymerized liquid crystal material (crystallizable monomers) is sandwiched between such two transparent substrates, and the liquid crystal material is polymerized under application of an electric field across the electrodes, providing an optically anisotropic diffraction grating of a polymer liquid crystal having a periodical alignment structure.

When a liquid crystal to be used has a positive dielectric anisotropy, portions with the electric field applied thereto in the unpolymerized liquid crystal material have liquid crystal molecules aligned so as to be parallel with the electric field and vertical to the transparent substrate. Portions without the electric field applied thereto are aligned so as to be parallel with the transparent substrates and parallel with the rubbing direction of alignment layers.

When the alignment layers have ability for vertical alignment and a liquid crystal material to be used has a negative dielectric anisotropy, portions without the electric field applied thereto are aligned so as to be vertical to the transparent substrates and portions with the electric field applied thereto are aligned so as to be parallel with the transparent substrates.

Making use of the difference between the alignment layers in terms of alignment ability, a photolithography technique and a rubbing technique can be combined to provide a periodical pattern with vertical alignment regions and horizontal alignment regions periodically included therein. An alternating electric field can be applied to improve an electric field distribution. In this case, the alignment layers can be omitted.

By the method just stated above, the entire liquid crystal material can be polymerized by heat, a ultraviolet ray and so on with a certain distribution applied to the alignment in the liquid crystal material, being solidified with the alignment distribution fixed.

The polymer liquid crystal is a polymer formed from crystallizable monomers, and means a polymer having an anisotropy in refractive index of not less than 0.02. The polymer liquid crystal per se does not necessarily exhibit a liquid crystal property.

It is preferable that the polymer liquid crystal is produced by polymerizing crystallizable monomers with light or heat. In particular, crystallizable monomers which can be polymerized with an ultraviolet ray or a visible ray are preferable since a polymer liquid crystal can be produced on sight (directly on the substrates) by a photolithography process.

A crystallizable monomer means a monomer which exhibits liquid crystal property at a room temperature or at temperature on photopolymerization. The liquid crystal property means to exhibit a known liquid crystal phase such as a nematic phase, a smectic phase and a cholesteric phase though a liquid crystal phase with a short helical pitch as in the cholesteric phase is not appropriate since it is unsuitable for the present invention.

The crystallizable monomer is preferably selected from esters of e.g. acrylic acid or methacrylic acid. The alcohol residue constituting the ester preferably contains at least one, especially two or three, phenyl groups. Further, the alcohol residue constituting the ester may contain one cyclohexyl group. The crystallizable monomer can be provided by two components or more in order to expand the temperature range where the crystallizable monomer can exist as a liquid crystal.

An optical head according to the present invention optically functions as follows. It is assumed that a diffraction element is prepared so that the rubbing direction of an alignment layer is aligned in a direction perpendicular to the grating of an electrode (in the right and left directions in FIG. 1). In the following explanation, a P wave means a ray which has been polarized in a direction parallel to the paper surface of FIG. 1. An S wave (a ray polarized in a direction vertical to the paper surface of FIG. 1) which has entered from a light source side of the diffraction element (a lower side in FIG. 1) enters an optically anisotropic diffraction grating from the lower side. At the time, no change is effected in the S wave since the optically anisotropic diffraction grating has the vertical aligned portions and the horizontally aligned portions of the polymer liquid crystal optically provided in a uniform manner with respect to the S wave. The S wave enters a quarter-wave plate as it is, is changed into a circularly polarized ray, transmits an aspherical lens (objective lens), and reaches a recording surface of an optically recording medium with about 100% of amount of light.

The ray which has reflected from the optically recording medium and returned through the aspherical lens transmits the quarter-wave plate again, and changes into a P wave with the polarization direction shifted to 90°. When the P wave enters the optically an isotropic diffraction grating, the diffracting grating exhibits its function with respect to the P wave since the vertically aligned portions and the horizontally aligned portions of the polymer liquid crystal have different refractive indices. At the time, about 40% of diffraction efficiency as a 1st order diffraction ray and about 40% of diffraction efficiency as a −1st order diffraction ray are obtained. When an optical detector is arranged on one side, 40% of utilization efficiency of light, and when an optical detector is arranged on each of sides, 80% of utilization efficiency of light is totally obtained.

Two periodical electrodes which are formed on the respective two transparent substrates can be unsymmetrical in terms of location and/or size to provide an unsymmetrical structure to portions of the polymer liquid crystal which correspond to the electrode portions and have been aligned in a certain direction by the electric field. As a result, the optical anisotropic diffraction grating can be obtained in such a way that either one of the ±1st order diffraction rays has a higher diffraction efficiency.

EXAMPLES

Example 1

As shown in FIG. 1, a glass substrate 1 which has 3 mm in thickness and 120 mm×120 mm in square has a solid transparent electrode 2 of ITO formed on a surface thereof. A similar glass plate 4 was prepared, and transparent electrodes 2 of ITO were periodically formed on a surface of the glass plate by a photolithography technique and a dry etching technique. The periodical transparent electrodes were formed so that the ratio of the width of each of the electrodes to that of a portion without an electrode was about 1:1.

After that, a polyimide film 3 having a thickness of about 100 nm was formed on the surfaces of the two glass substrates 1 and 4 with the transparent electrodes 2 formed thereon by spin coating. The polyimide film 3 was subjected a rubbing treatment for a horizontal alignment. At that time, the rubbing direction on the substrates with the electrodes formed thereon was vertical to the grating of the transparent electrodes 2 (in a periodical direction)- The two glass substrates were arranged so that the transparent electrodes 2 confronted one another, the angle of the alignment direction between the upper and lower substrates was 180° and the gap between the two glass substrates was 3 µm.

A liquid crystal material (crystallizable monomers) in liquid form which included a 4-ω-acryloyloxyalkylxoy-4'-cyanobiphenyl and a 4-coacryloyloxyalkylxoybenzoic acid 4'-n-alkyloxyphenylester as main components was injected into the gap to be sandwiched between the two glass substrates. At that time, the crystallizable monomers had 1% of benzoin isopropyl ether added therein as a photopolymerizable initiator to obtain a crystallizable monomer composition having an ultraviolet curable property.

After that, a voltage of 5V was applied across the electrodes, and the crystallizable monomer composition was vertically aligned at portions corresponding to the split electrodes which were prepared by periodically forming the electrodes (vertically aligned portions 7). Portions which did not correspond to the split electrodes became horizontally aligned portions 8. The split electrodes had a pitch (period) of 4 µm, and each split electrode had a width of 2 µm. After that, an ultraviolet ray having a wavelength of 360 nm was irradiated to the entire crystallizable monomer composition to polymerize and cure the entire crystallizable monomer composition with the alignment state held, fixing the entire structure.

The glass substrate 4 had a quarter-wave plate 5 laminated and bonded to an upper surface thereof (a surface opposite to the liquid crystal) by a transparent adhesive agent, and a glass substrate 6 having good flatness was laminated and bonded to an upper surface of the quarter-wave plate 5 by a transparent adhesive agent. Although the glass substrate 6 is provided to improve the wave front aberration of a light incident and outgoing surface of the entire diffraction element, the quarter-wave plate 5 can be omitted if it has good flatness. In this manner, the diffraction element was fabricated so as to have an optically anisotropic diffraction grating.

The diffraction element had a refractive index of 1.52 (ordinary ray refractive index) at portions with electric field applied thereto (the vertically aligned portions 7) and a refractive index of 1.53 (ordinary ray refractive index) at portions without the electric field applied thereto (the horizontally aligned portions 8) with respect to an S wave (a ray polarized in a direction vertical to the paper surface in FIG. 1). With respect to a P wave (a ray polarized in a direction perpendicular to the paper surface in FIG. 1), a refractive index of 15.4 (ordinary ray refractive index) at the potions with the electric field applied thereto and a refractive index of 1.66 (extraordinary ray refractive index) at the portions without the electric field applied thereto were obtained, and a refractive index difference of about 0.12 was obtained.

A semiconductor laser (a light wavelength of 780 nm) as a light source, the diffraction element, a quarter-wave plate, an aspherical lens (objective lens), an optical disc, and a photodiode as a optical detector were used to fabricate an optical head. The light transmission with respect to an incident ray (S wave) having a light wavelength 780 m was about 80%, and the diffraction efficiency to a P wave which a reflected ray (circularly polarized ray) from the optical disc was transformed into by the quarter-wave plate was obtained at a value of about 25% with respect to both of ±1st order diffraction rays.

Example 2

A diffraction element was fabricated as in the Example 1 except that the structure of the transparent electrodes 2 was modified as described below.

Figure 2:
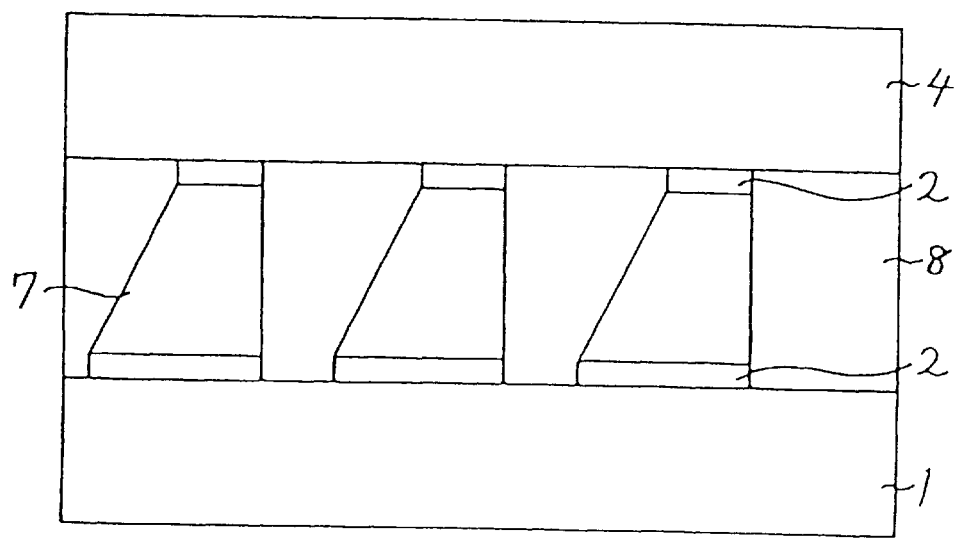
FIG. 2 is a side view partly in section of the diffraction element for an optical head according to an embodiment of the present invention.

As shown in FIG. 2, the transparent electrodes 2 on the side of the glass substrate 1 were periodically formed, and each split electrode had a width of 4 µm and a pitch of 8 µm. The transparent electrodes 2 on the side of the glass substrate 4 were also periodically formed, and each split electrode had a width of 2 µm and a pitch of 8 µm. In this case as well, each of the substrates had an alignment direction extended in a direction perpendicular to the grating (a periodic direction) and the angle of the alignment direction between the upper and lower substrates was 180°.

In this case, a refractive index of 1.52 (ordinary ray refractive index) at portions with the electric field applied thereto (vertically aligned portions 7) and a refractive index of 1.52 (ordinary ray refractive index) at portions without the electric field applied thereto (horizontally aligned portions 8) were obtained with respect to an S wave. With respect to a P wave, a refractive index of 1.53 (ordinary ray refractive index) at the portions with the electric field applied thereto and a refractive index of 1.65 (extraordinary ray refractive index) at the portions without the electric field applied thereto were obtained, and a refractive index difference of about 0.12 was obtained.

A semiconductor laser (a light wavelength of 780 nm) as a light source, the diffraction element, a quarter-wave plate, an aspherical lens (objective lens), an optical disc, and a photodiode as an optical detector were used to fabricate an optical head. The light transmittance with respect to an incident ray (S wave) having a light wavelength of 780 m was about 78%, and the diffraction efficiency to a P wave which a reflected ray (circularly polarized ray) from the optical disc was transformed into by the quarter-wave plate was obtained at a value of about 28% for a +1st order diffraction ray and about 19% for a −1st order diffraction ray.

Example 3

A diffraction element was fabricated as in the Example 1 except that no transparent electrodes 2 were formed and alignment layers were provided as explained below.

Horizontal alignment layers (polyimide film) and vertical alignment layers were alternately formed on each of the glass substrates 1 and 4 by a photolithography technique and a mask rubbing technique. The vertical alignment layers were formed by coating a fluorine type surfactant $(C_8F_{17}SO_2NH(CH_2)_3N^+(CH_3)_3 \cdot I^-)$. The glass substrates 1 and 4 were layered and bonded together with a gap of 5 μm so that a horizontal alignment layer confronted a corresponding horizontal alignment layer and a vertical alignment layer confronted a corresponding vertical alignment layer (the alignment layers were symmetrical between the glass substrates 1 and 4). Each horizontal alignment layer was a width of 4 μm, and each vertical alignment layer had a width of 4 μm to provide the alignment layers having a pitch of 8 μm, which had an alignment force periodically changed which had an alignment force periodically changed. In this case, horizontally aligned portions had an alignment direction extended in the periodical direction with the horizontally aligned portions alternately formed. The angle of the alignment direction between the upper and lower substrates was 180°.

In this case, a refractive index of 1.53 (ordinary ray refractive index) at the vertically aligned portions and a refractive index of 1.53 ordinary ray refractive index) at the horizontally aligned portions were obtained with respect to an S wave. With respect to a P wave, a refractive index of 1.54 (ordinary ray refractive index) at the vertically aligned portions and a refractive index of 1.65 (extraordinary ray reflective index) at the horizontally aligned portions were obtained, and a refractive index difference was obtained at a value of about 0.11.

A semiconductor laser (a light wavelength of 780 nm) as a light source, the diffraction element, a quarter-wave plate, an aspherical lens (objective lens), an optical disc, and a photodiode as an optical detector were used to fabricate an optical head. The light transmittance to an incident ray (S wave) having a light wavelength of 780 m was about 70%, and the diffraction efficiency to a P wave which a reflected ray (circularly polarized ray) from the optical disc was transformed into by the quarter-wave plate was obtained at a value of about 20% for a ±1st order diffraction ray and about 20% for a −1st order diffraction ray.

Example 4

A diffraction element was fabricated as in the Example 1 except that the structure of the transparent electrodes 2 were modified as explained below.

The transparent electrodes 2 were periodically formed on the glass substrates 1 and 4. One period was determined as 9 μm, and sets of a non-electrode portion having a width of about 3 μm and two split electrodes having a width of about 3 μm in one period were provided from an end in the order as stated earlier. The glass substrates 1 and 4 were layered and bonded together with a gap of 5 μm so that a non-electrode portion confronted a corresponding non-electrode portion and a split electrode confronted a corresponding split electrode (the non-electrode portions and the split electrodes were symmetrical between the glass substrates 1 and 4). A central split electrode D in one period had a voltage of 2V applied thereto, and another split electrode E had a voltage of 5V applied thereto.

Thus, the crystallizable monomer composition at the non-electrode portion was changed into a horizontally aligned portion, a portion corresponding to the split electrode E was changed into a vertically aligned portion, and a portion corresponding to the split electrode E was changed into an alignment state which was almost intermediate between a horizontal alignment and a vertical alignment. As a result, the alignment state in one period was unsymmetrical. After that, an ultraviolet ray having a wavelength of 360 nm was irradiated to the entire crystallizable monomer composition to polymerize and cure the entire crystallizable monomer composition with the alignment state held, fixing the entire structure.

In this case, with respect to an S wave, a refractive index of 1.52 (ordinary ray refractive index) at the vertically aligned portions, a refractive index of 1.52 (ordinary ray refractive index) at the intermediately aligned portions, and a refractive index of 1.52 (ordinary ray refractive index) at the horizontally aligned portions were obtained. With respect to a P wave, a refractive index of 1.66 (ordinary ray refractive index) at the vertically aligned portions, a refractive index 1.60 at the intermediately aligned portions, and a refractive index of 1.54 (extraordinary ray refractive index) at the horizontally aligned portions were obtained, and the refractive indices were stepwise changed.

A semiconductor laser (a light wavelength of 780 nm) as a light source, the diffraction element, a quarter-wave plate, an aspherical lens (objective lens), an optical disc, and a photodiode as an optical detector were used to fabricate an optical head. The light transmittance to an incident ray (S wave) having a light wavelength of 780 m was about 80%, and the diffraction efficiency to a P wave which a reflected ray (circularly polarized ray) from the optical disc was transformed into by the quarter-wave plate was obtained at a value about 29% for a ±1st order diffraction ray and at a value of about 20% for a −1st order diffraction ray.

Example 5

As shown in FIG. 1, glass substrates 1 and 4 which are 1.1 mm in thickness and 120 mm×120 mm in square have transparent electrodes 2 of ITO having a thickness 1000 Å formed on a surface thereof. The ITO electrodes on the glass substrates 1 and 4 were subjected to a photolithography technique and a wet etching technique to be modified into periodically formed ITO transparent electrodes 2. At that time, the periodically formed transparent electrodes were formed so that the ratio of the width of an electrode portion to a width a non-electrode portion was about 0.8:1.2.

After that, a polyimide film 3 having a thickness about 100 nm was formed the surfaces of the two glass substrates 1 and 4 with the transparent electrodes 2 formed thereon by a spin coating technique. The polyimide film 3 was subjected to a rubbing treatment to extend in a direction perpendicular to the ITO electrode gratings for horizontal alignment. The two glass substrates were arranged so that the transparent electrodes 2 confronted one another, the angle of the alignment direction between the upper and lower substrates was 180°, and the gap between the two glass substrates was 5 μm.

A liquid crystal material (crystallizable monomers) in liquid form which includes a 4'-acryloyloxyalkyloxy-4-cyanobiphenyl and a 4-ω-acryloyloxyalkyloxybenzoic acid 4'-n-alkyloxyphenylester as main components was injected into the gap to be sandwiched between the two glass substrates. At that time, the crystallizable monomers had benzoin isopropyl ester of 1% added thereinto as a photo-polymerization initiator, providing a crystallizable monomer composition having an ultraviolet curable property.

After that, a rectangular wave of a.c. voltage was applied across the electrodes at 5V and 100 Hz to vertically align the crystallizable monomer composition at portions which corresponded to the periodically formed split electrodes (vertically aligned portions 7). Portions which did not correspond to the split electrodes became horizontally aligned portions 8. The pitch (period) of the split electrodes was 20 μm, and the width of a split electrode was 8 μm. After that, an ultraviolet ray having a wavelength of 360 nm was irradiated to the entire crystallizable monomer composition to polymerize and cure the crystallizable monomer composition with the alignment state held, fixing the entire structure.

The glass substrate 4 had a quarter-wave plate 5 layered on and bonded to an upper surface thereof (a surface opposite to the liquid crystal) by a transparent adhesive agent, and the quarter-wave plate 5 had a glass substrate 6 having good flatness layered on and bonded to an upper surface thereof by a transparent adhesive agent. Although the glass substrate 6 was provided to improve the wavefront aberration on a light incident and outgoing surface of the entire diffraction element, it can be omitted if the quarter-wave plate 5 has good flatness. In this manner, the diffraction element was fabricated so as to have an optically anisotropic diffraction grating.

The diffraction element had a refractive index of 1.52 (ordinary ray refractive index) at the electric field applied portions (the vertically aligned portions 7), and a refractive index of 1.53 (ordinary ray refractive index) at the non-electric field applied portions (the horizontally aligned portions 8) with respect to an S wave (a ray polarized in a direction perpendicular to the paper surface in FIG. 1). With regard to a P wave (a ray polarized in parallel with the paper surface in FIG. 1), a refractive index of 1.54 (ordinary ray refractive index) at the electric field applied portions, and a refractive index of 1.66 (extraordinary ray refractive index) at the non-electric field applied portions were obtained, and the refractive index difference was obtained at a value of about 0.12.

A semiconductor laser (a light wavelength of 780 nm) as a light source, the diffraction element, a quarterwave plate, an aspherical lens (objective lens), an optical disc, and a photodiode as an optical detector were used to fabricate an optical head. The light transmittance to an incident ray (S wave) having a light wavelength of 780 m was about 84%, and the diffraction efficiency to a P wave which a reflected ray (circularly polarized ray) from the optical disc was transformed into by the quarter-wave plate was obtained at a value of about 32% for ±1st order diffraction rays.

Example 6

A diffraction element was fabricated as in the Example 5 except that the structure of the transparent electrodes 2 was modified as described below.

As shown in FIG. 2, the transparent electrodes 2 on the glass substrate 1 were periodically formed, and each split electrode had a width of 8 μm and a pitch of 16 μm. The transparent electrodes 2 on the glass substrate 4 were also periodically formed, and each split electrode was a width of 6 μm and a pitch of 16 μm. The gap between the two substrates was 3 μm. A rectangular wave of a.c. voltage was applied at 7V and 100 Hz on irradiation of an ultraviolet ray.

In this case, with respect to an S wave, a refractive index of 1.52 (ordinary ray refractive index) at the electric field applied portions (the vertically aligned portions 7), and a refractive index of 1.52 (ordinary ray refractive index) at the non-electric field applied portions (the horizontally aligned portions 8) were obtained. With respect to a P wave, a refractive index of 1.53 (ordinary ray refractive index) at the electric field applied portions, and a refractive index of 1.65 (extraordinary refractive index) at the non-electric field applied portions were obtained, and the refractive index difference was obtained at a value of about 0.12.

A semiconductor laser (a light wavelength of 780 nm) as a light source, the diffraction element, a quarter-wave plate, an aspherical lens (objective lens), an optical disc, and a photodiode as an optical detector were used to fabricate an optical head. The light transmittance to an incident ray (S wave) having a light wavelength of 780 m was about 89%, and the diffraction efficiency to a P wave which a reflected ray (circularly polarized ray) from the optical disc was transformed into by the quarter-wave plate was obtained at a value of about 40% for a ±1st order diffraction ray and a value of about 26% for a −1st order diffraction ray.

INDUSTRIAL APPLICABILITY

In accordance with the present invention, the electrodes can be periodically formed or the alignment direction of the alignment layers can be periodically changed to easily provide an optically anisotropic diffraction grating having a small pitch (period). Since split electrodes or split alignment layers can be unsymmetrically arranged between two transparent substrates to easily form an unsymmetrical optically anisotropic diffraction grating, a diffraction element wherein either one of ±1st order diffraction rays has a higher diffraction efficiency can be easily fabricated. Since crystallizable monomers can be aligned by an electric field using only electrodes, alignment layers can be eliminated.

What is claimed is:

1. An optical head which irradiates a ray from a light source to an optical recording medium through a diffraction element so as to read information and/or write information, wherein:

the diffraction element includes an optically anisotropic diffraction grating which comprises an optically anisotropic polymer liquid crystal sandwiched between two transparent substrates, the polymer liquid crystal has an alignment direction thereof periodically changed, both of the two transparent substrates have electrodes mounted thereon, both of the electrodes comprise periodically formed electrode pieces, and two electrodes are unsymmetrically arranged between the two transparent substrates.

2. An optical head which irradiates a ray from a light source to an optical recording medium through a diffraction element so as to read information and/or write information, wherein:

the diffraction element includes an optically anisotropic diffraction grating which comprises an optically anisotropic polymer liquid crystal sandwiched between two transparent substrates, the polymer liquid crystal has an alignment direction thereof periodically changed, both of the two transparent substrates have electrodes mounted thereon, at least one of the electrodes comprises periodically formed electrode pieces, and the periodically formed electrode pieces of the at least one of the electrodes have a width of 30–45% of a periodical pitch thereof.

3. An optical head which irradiates a ray from a light source to an optical recording medium through a diffraction element so as to read information and/or write information, wherein:

the diffraction element includes an optically anisotropic diffraction grating which comprises an optically anisotropic polymer liquid crystal sandwiched between two transparent substrates, the polymer liquid crystal has an alignment direction thereof periodically changed, both of the two transparent substrates have electrodes mounted thereon, both of the electrodes comprise periodically formed electrode pieces, and the periodically formed electrode pieces of both electrodes have a width of 30–45% of a periodical pitch thereof.

4. An optical head which irradiates a ray from a light source to an optical recording medium through a diffraction element so as to read information and/or write information, wherein:

the diffraction element includes an optically anisotropic diffraction grating which comprises an optically anisotropic polymer liquid crystal sandwiched between two transparent substrates, the polymer liquid crystal has an alignment direction thereof periodically changed, at least one of the transparent substrates has a side thereof contacting the polymer liquid crystal formed with an alignment layer, and at least one of the alignment layers includes alignment layer pieces which periodically have different alignment forces.

5. The optical head according to claim 4, wherein the alignment layers o f both of the two transparent substrates respectively include alignment layer pieces which periodically have different alignment forces, and the alignment layer pieces which periodically have different alignment forces are unsymmetrically arranged between the two transparent substrates.

6. An optical head which irradiates a ray from a light source to an optical recording medium through a diffraction element so as to read information and/or write information, wherein:

the diffraction element includes an optically anisotropic diffraction grating which comprises an optically anisotropic polymer liquid crystal sandwiched between two transparent substrates, the polymer liquid crystal has an alignment direction thereof periodically changed, an alignment layer is formed on an electrode, and the alignment layer is one which is subjected to rubbing so as to extend perpendicularly to a longitudinal direction of the electrode.

7. A method for manufacturing an optical head which irradiates a ray from a light source to an optical recording medium through a diffraction element so as to read information and/or write information, the method comprising:

providing electrodes on two transparent substrates;

forming at least one of the electrodes so as to comprise periodically formed electrode pieces;

providing an alignment layer on a side of at least one of the two transparent substrates which contacts a liquid crystal material;

sandwiching the liquid crystal material between the two transparent substrates, the liquid crystal material being polymerizable;

applying a periodical electric field to the electrodes to align the liquid crystal material; and polymerizing the liquid crystal material in such an aligned state, thereby fabricating a diffraction element which includes an optically anisotropic diffraction grating.

8. The method for manufacturing an optical head according to claim 7, wherein the periodically formed electrode pieces include a certain number of split electrodes included in one period, the respective split electrodes in the one period have different electric fields applied thereto, the liquid crystal material in the one period has an aligned state thereof made bilaterally unsymmetrical, and then the liquid crystal material is polymerized.

9. The method for manufacturing an optical head according to claim 7, further comprising a step A for sandwiching the liquid crystal material in an unpolymerized state between the two transparent substrates and periodically polymerizing the liquid crystal material by periodical masking exposure, and a step B for polymerizing the entire liquid crystal material by non-masking exposure after the first step, a voltage being applied in either one of the step A and the step B.

10. The method for manufacturing an optical head according to claim 7, wherein the alignment layer has been subjected to an alignment treatment so that liquid crystal molecules are aligned in a direction perpendicular to a longitudinal direction of the electrodes.

11. A diffraction element which sandwiches an optically anisotropic polymer liquid crystal between two transparent substrates, wherein:

the liquid crystal sandwiched between the two transparent substrates is a polymer liquid crystal, the polymer liquid crystal has an alignment direction thereof periodically changed, both of the two transparent substrates have electrodes mounted thereon, both of the electrodes comprise periodically formed electrode pieces, and the two electrodes are unsymmetrically arranged between the two transparent substrates.

12. A diffraction element which sandwiches an optically anisotropic polymer liquid crystal between two transparent substrates, wherein:

the liquid crystal sandwiched between the two transparent substrates is a polymer liquid crystal, the polymer liquid crystal has an alignment direction thereof periodically changed, both of the two transparent substrates have electrodes mounted thereon, at least one of the electrodes comprises periodically formed electrode pieces, and the periodically formed electrode pieces of the at least one of the electrodes have a width of 30–45% of a periodical pitch thereof.

13. A diffraction element which sandwiches an optically anisotropic polymer liquid crystal between two transparent substrates, wherein:

the liquid crystal sandwiched between the two transparent substrates is a polymer liquid crystal, the polymer liquid crystal has an alignment direction thereof periodically changed, both of the two transparent substrates have electrodes mounted thereon, both of the electrodes comprise periodically formed electrode pieces, and the periodically formed electrode pieces of both electrodes have a width of 30–45% of a periodical pitch thereof.

14. A diffraction element which sandwiches an optically anisotropic polymer liquid crystal between two transparent substrates, wherein:
- the liquid crystal sandwiched between the two transparent substrates is a polymer liquid crystal,
- the polymer liquid crystal has an alignment direction thereof periodically changed,
- at least one of the transparent substrates has a side thereof contacting the polymer liquid crystal formed with an alignment layer, and
- at least one of the alignment layers includes alignment layer pieces which periodically have different alignment forces.

15. The diffraction element according to claim 14, wherein the alignment layers of both of the two transparent substrates respectively include alignment layer pieces which periodically have different alignment forces, and the alignment layer pieces which periodically have different alignment forces are unsymmetrically arranged between the two transparent substrates.

16. A diffraction element which sandwiches an optically anisotropic polymer liquid crystal between two transparent substrates, wherein:
- the liquid crystal sandwiched between the two transparent substrates is a polymer liquid crystal,
- the polymer liquid crystal has an alignment direction thereof periodically changed,
- an alignment layer is formed on an electrode, and
- the alignment layer is one which is subjected to rubbing so as to extend perpendicularly to a longitudinal direction of the electrode.

* * * * *